United States Patent [19]

Moughanni et al.

[11] Patent Number: 6,003,133

[45] Date of Patent: Dec. 14, 1999

[54] DATA PROCESSOR WITH A PRIVILEGED STATE FIREWALL AND METHOD THEREFORE

[75] Inventors: Claude Moughanni, Austin; William C. Moyer, Dripping Springs; Taimur Aslam, Austin, all of Tex.

[73] Assignee: Motorola, Inc., Schaumburg, Ill.

[21] Appl. No.: 08/972,069

[22] Filed: Nov. 17, 1997

[51] Int. Cl.$^6$ .................................................. G06F 12/00
[52] U.S. Cl. ........................ 713/200; 713/201; 714/815
[58] Field of Search .................................. 713/200, 201; 714/815; 365/185.04; 340/568.1

[56] References Cited

U.S. PATENT DOCUMENTS

| | | | |
|---|---|---|---|
| 4,698,750 | 10/1987 | Wilkie et al. | 365/185.04 |
| 4,752,930 | 6/1988 | Kitamura et al. | 371/62 |
| 4,763,296 | 8/1988 | Gercekci | 364/900 |
| 5,251,304 | 10/1993 | Sibigtroth et al. | 713/200 |
| 5,432,950 | 7/1995 | Sibigtroth | 713/200 |
| 5,557,743 | 9/1996 | Pombo et al. | 713/200 |
| 5,564,016 | 10/1996 | Korenshtein | 713/200 |
| 5,677,891 | 10/1997 | Short et al. | 365/230.06 |
| 5,704,039 | 12/1997 | Yishay et al. | 713/200 |
| 5,724,027 | 3/1998 | Shipman et al. | 713/201 |
| 5,734,820 | 3/1998 | Howard et al. | 713/200 |
| 5,737,760 | 4/1998 | Grimmer, Jr. et al. | 713/200 |
| 5,757,271 | 5/1998 | Andrews | 340/568.1 |
| 5,805,820 | 9/1998 | Bellovin et al. | 713/201 |
| 5,809,544 | 9/1998 | Dorsey et al. | 713/201 |
| 5,847,962 | 12/1998 | LaDue et al. | 364/479.07 |

OTHER PUBLICATIONS

Motorola, "Semiconductors, MC68HC11A8 Technical Summary, HCMOS," Motorola Semiconductor Products Inc., pp. 1–12.

Motorola, "MCF5206 ColdFire Integrated Microprocessor User's Manual," Rev. 1.0, 2 pp. 6–80–6–84 & 7.3 (1997).

Primary Examiner—Robert W. Beausoliel, Jr.
Assistant Examiner—Wasseem Hamdan
Attorney, Agent, or Firm—Paul J. Polansky

[57] ABSTRACT

A data processor (20) includes a firewall circuit (50) that monitors privilege level changes or transitions between privilege modes, such as from user mode and user space into supervisory or privileged mode and operating system space. The firewall circuit starts a timer (54) whenever a central processing unit (22) enters supervisor mode. If the timer (54) determines the passage of a predetermined time while the central processing unit remains continuously in supervisory mode without re-entering user mode, a predefined security policy is invoked. For example, the security policy may require at this point that the data processor (20) is to be reset. Different timer (54) time-out values and different security policies can be set for different types of privilege level changes. In one embodiment, a default time-out value provides protection for multiple types of privilege level changes.

21 Claims, 3 Drawing Sheets

DATA PROCESSOR WITH A PRIVILEGED STATE FIREWALL AND METHOD THEREFORE

FIELD OF THE INVENTION

The present invention relates generally to data processors, and more particularly, to data processors operating at multiple privilege levels.

BACKGROUND OF THE INVENTION

Security is an important issue within the development of integrated circuits. Components and information within these integrated circuits require some way to provide access protection to protect the integrity of these systems. A security system of some form is usually implemented to prevent unauthorized access to particular locations or components of these integrated circuit. Typically, an integrated circuits is capable of executing software in a privileged mode and a non-privileged mode. Trusted software such as the operating system, interrupt handlers, and initialization routines execute in the privilege mode. Applications or user software typically execute in a non-privileged mode and have restricted access to hardware components and memory locations. In order to access privileged locations or components, application software makes a request to the operating system which services this request on behalf of the application software. This delineation of control is needed to prevent the non-privileged application software from accessing or modifying privileged data.

It is becoming increasingly important to protect privileged information against unauthorized access. Numerous methods have been used in the past to protect this information. One such method is to encrypt the information. Another such method is termed "security through obscurity", which means that data is secured through obscuring how it is secured.

Neither encryption nor security through obscurity is sufficient on its own to protect data. Encrypted data can be decrypted, and security through obscurity can be reverse engineered.

One of the basic protections in almost all data processing systems is to separate user data from operating system data and to restrict access to privileged information by use of memory protection techniques and devices controlled by an operating system. Therefore, one of the traditional methods of illegally gaining access to this privileged information has been to gain control of the operating system by a user program. A user program by some machinations gets itself in supervisory mode, and thus has access to the privileged information. A number of different techniques have been perfected through time to achieve this goal. Some of these techniques include redirecting interrupts, passing illegal parameters to interrupt handlers, memory overflows, and masquerading as a supervisory routine. Indeed, modem technology even allows a supervisory bit to be forced to a specific value. Significant effort is made in operating system design to thwart these sorts of unauthorized entries. However, a corresponding large effort is also made to overcome these new methods of detecting unauthorized entries into the operating system and supervisory mode.

Because of the ongoing race between system developers and system crackers, it would be advantageous to be able to restrict entry into the operating system and into supervisory mode by nonauthorized users regardless of how the supervisory mode is entered.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

A firewall circuit is disclosed herein that monitors transitions from user mode and user space into supervisory or privileged mode and operating system space. This is considered herein to be a privilege level change. A timer is started whenever the privilege level changes and supervisor mode is entered. Then, when the timer exceeds specified threshold, or decrements to zero, while still in supervisory mode without re-entering user mode, a predefined security policy is invoked. For example, the security policy may require at this point that the data processing system may be reset. Another security policy may be to invalidate non-volatile memory. A third security policy may be to destroy the functionality of the integrated circuit containing the firewall circuit. This can be done by either blowing fuses, or destroying features through application of excess voltages. Different timer time-out values can be set for different ways of entering supervisory mode. Likewise, different security policies may be invoked depending on which way the supervisory mode was entered and what time-out value was exceeded. A default time-out value and corresponding security policy provides a safety measure for protecting against unanticipated privileged mode entries.

Figure 1:
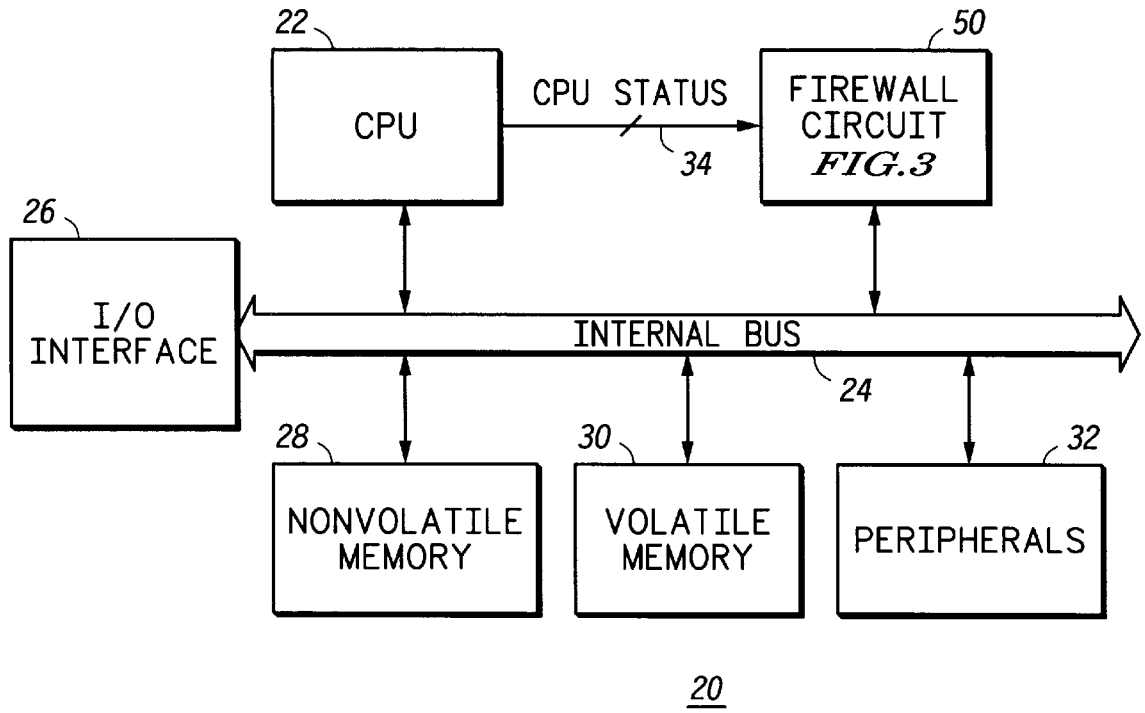
FIG. 1 illustrates in block diagram form a data processor with a privileged state firewall according to the present invention.

FIG. 1 is a block diagram for the data processing system 20. It comprises CPU 22, I/O interface 26, non-volatile memory 28, volatile memory 30, peripherals 32 and firewall circuit 50, all communicating over internal bus 24. The bus 24 includes address, data, and control signals. Note that not all signals in the bus 24 connect to each module in the data processing system 20. The CPU 22 can be an embedded processor or a stand alone microprocessor. The non-volatile memory 28 is typically ROM, FLASH, EPROM, EEPROM, one time programmable memories, or other comparable memories. Volatile memory 30 is typically DRAM, or SRAM. The peripherals 32 include I/O devices, timers, coprocessors, and other blocks or elements that are commonly placed on an integrated circuit in a microcontroller. The I/O interface 26 is an interface between the internal bus 24 and an environment outside a microcontroller integrated circuit.

The firewall circuit 50 receives CPU status signals 34 from the CPU 22. Most notable of these CPU status signals 34 are indications of privilege level change, in particular indications of change of the CPU's program state from user mode to supervisory mode, specific interrupts received, and other indications of reasons to transist or change from user mode to supervisory or privileged mode. The firewall circuit 50 provides signals directly to the other elements in the data processing system 20 via a shared bus 24. These signals include potentially reset, forced exceptions, and indications of other actions taken in response to firewall time-outs.

Figure 2:
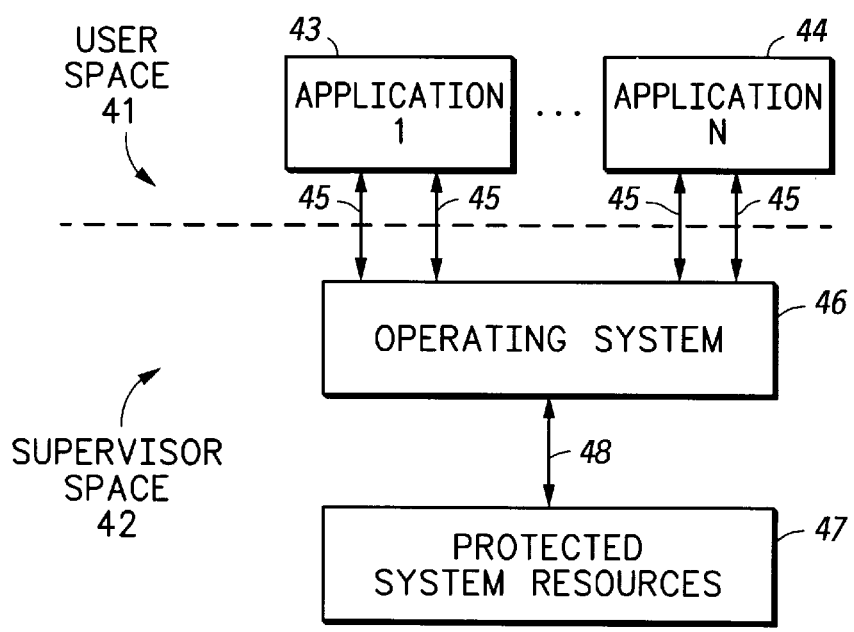
FIG. 2 illustrates in block diagram form the system resource protection mechanism provided by the data processor of FIG. 1.

FIG. 2 is a block diagram illustrating operation of the data processing system 20. User applications 43, 44 are stored in and execute out of user space 41 in either volatile memory 30 or non-volatile memory 28, and execute in application, user, or non-privileged mode. The operating system 46 executes in supervisory space 42, and typically executes in supervisory mode. The operating system 46 executing in supervisory space 42 operates as an interface between applications 43, 44 and protected system resources 47. This separation of the applications 43, 44 and the protected system resources 47 allows for heightened security, and better sharing of the protected system resources 47. The protected system resources 47 are those resources controlled by the operating system 46. Typically, peripherals are controlled by the operating system 46 and not by applications 43, 44. Likewise, actual input/output instructions are executed by the operating system 46, for the benefit, and at the behest of applications 43, 44. Other protected system resources 47 include initializing clocks, initializing peripherals, exception handling, memory mapping, and allocation of resources.

The interface 45 between user applications 43, 44 and the operating system 46 is typically well defined. This is particularly true of the different methods of changing privilege level. This user/supervisor interface 45 typically consists of interrupts, system calls, reset, and exceptions. The CPU 22 typically changes privilege level and enters supervisory space 42 and supervisor or privileged mode when one of these situations is encountered.

Figures 3, 4:
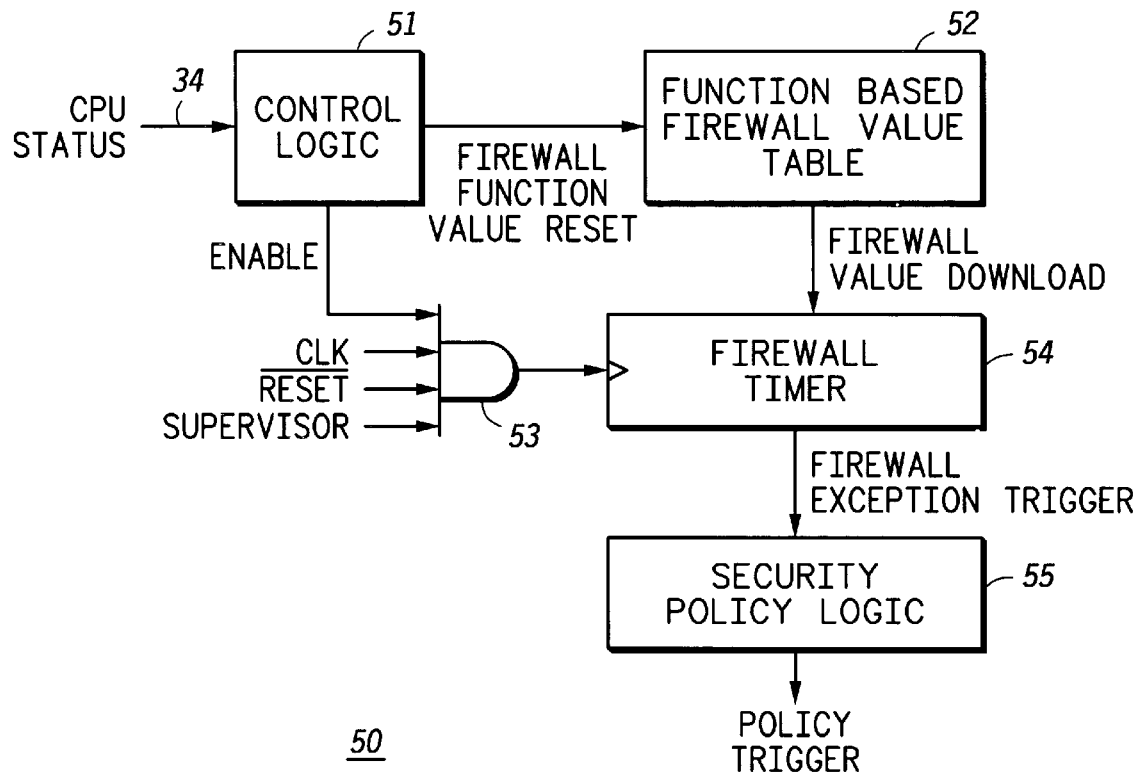
FIG. 3 illustrates in partial block diagram and partial logic diagram form one embodiment of the firewall circuit of FIG. 1.
FIG. 4 illustrates in tabular form the firewall value table of FIG. 3.

FIG. 3 is a block diagram that illustrates a preferred embodiment of the firewall circuit 50. Exception attributes and CPU status signals 34 are received by control logic 51. These CPU status signals 34 indicate to the firewall circuit 50 whether the CPU 22 is in privileged or non-privileged mode, and if in privileged mode how the privilege level was changed. Control logic 51 provides a firewall function value select signal which allows selection of a function based firewall value download from a function based firewall value table indexed or based upon the firewall function value select signal. The firewall value download is loaded in a firewall timer 54 and decremented until it hits zero. The firewall timer 54 is disabled when the processor 22 re-enters user mode and reinitialized when the processor 22 again changes privilege level and re-enters privileged mode. If the firewall timer 54 decrements to zero, a firewall exception is triggered and security policy logic 55 is invoked in order to determine what to do with the time-out and to generate a policy trigger. For example, a system exception may be issued, or a system reset depending upon the firewall exception trigger. The security policy logic 55 may use a portion of the function based firewall value table to determine the proper policy trigger for a given firewall function value or security violation, it may use a separate table, or it may provide a standard time-out response.

Control logic 51 also provides an ENABLE signal input to AND gate 53. Other inputs to the AND gate 53 are a clock signal (CLK), an inverted reset (RST) signal, and a signal indicating supervisory or privileged mode (SUPERVISOR). When ENABLE, CLK, inverted reset (RST), and SUPERVISOR signals are all asserted, the firewall timer 54 is enabled.

FIG. 4 is a table used to determine time-out values and time-out actions based on how supervisory state is entered. One column in the firewall value table 60 indicates the reason that the privilege level was changed and supervisory state was entered. A corresponding entry in a second column indicates the time-out value to be used for that specific reason for entering supervisory state. There may also be a third column in firewall table 60 that indicates the policy action to be taken when the firewall timer 54 is triggered. For example, in one instance, a systems engineer may determine that a reset command or signal is appropriate. In another instance, it may be preferable to totally disable the data processing system 20. For example, non-volatile memory 28 may be zapped as a security measure. Another alternative is to destroy the functionality of an integrated circuit die containing the data processing system 20. This can be done by blowing fuses, or by applying overvoltages to the dies. Finally, there can be default entries in the firewall value table 60. This default value is useful in identifying and responding to supervisor or privileged mode transitions 45 that are not covered in the firewall value table 60. Alternatively, the default table entry can be used to limit the number of different types of handling supported by the firewall circuit 50.

Table T-1 below is a sample Firewall Value Table 60 that illustrates table shown in FIG. 4 in more detail. Firewall time-out values T01 through T20 identify different time-out values for different Supervisory Functions. Likewise, Exception Actions A01 through A20 indicate different exception actions to be taken when the timer times out with the corresponding Firewall Time-out value.

TABLE T-1

Firewall Value Table

| Vector | Vector Offset | Supervisor Function | Firewall Time-out | Exception Action |
|---|---|---|---|---|
| 0 | 000 | Reset | T01 | A01 |
| 1 | 004 | Misaligned Access | T02 | A02 |
| 2 | 008 | Access Error | T03 | A03 |
| 3 | 00C | Divide by Zero | T04 | A04 |
| 4 | 010 | Illegal Instruction | T05 | A05 |
| 5 | 014 | Privilege Violation | T06 | A06 |
| 6 | 018 | Trace Exception | T07 | A07 |
| 7 | 01C | Breakpoint Exception | T08 | A08 |
| 8 | 020 | Unrecoverable Error | T09 | A09 |
| 9 | 024 | Soft Reset | T10 | A10 |
| 10 | 028 | INA Autovector | T11 | A11 |
| 11 | 02C | FINA Autovector | T12 | A12 |
| 12 | 030 | Hardware Accelerator | T13 | A13 |
| 13 | 034 | Reserved | T14 | A14 |
| 14 | 038 | Reserved | T15 | A15 |
| 15 | 03C | Reserved | T16 | A16 |
| 16–19 | 040–04C | Trap #0–3 Instruction Vectors | T17 | A17 |
| 20–31 | 050–05C | Reserved | T18 | A18 |
| 32–127 | 080–1FC | Vectored Interrupt Controller | T19 | A19 |
| 9999 | | Default Table Entry | T20 | A20 |

Figure 5:
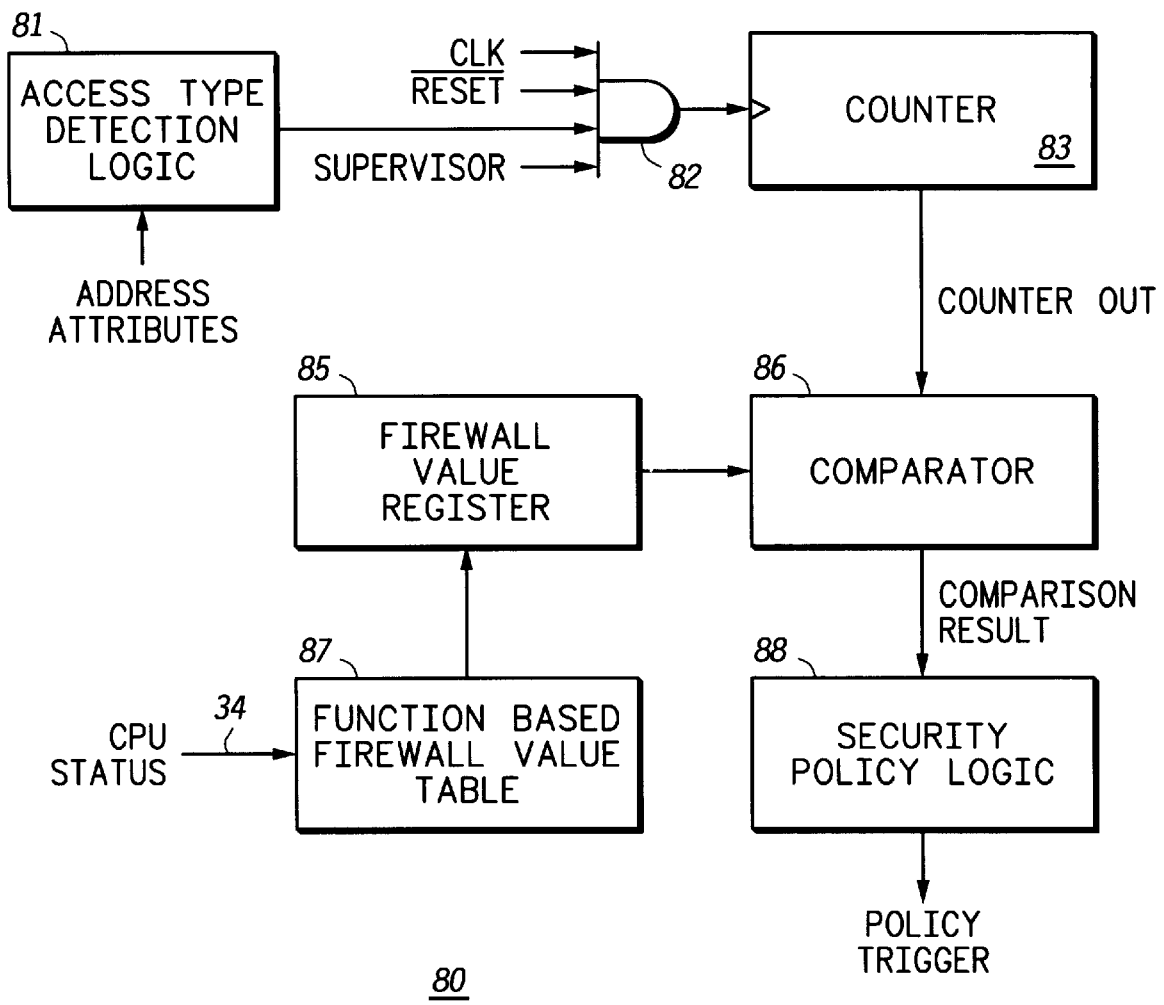
FIG. 5 illustrates in partial block diagram and partial logic diagram form a second embodiment of the firewall circuit of FIG. 1

FIG. 5 is a block diagram that illustrates an alternate embodiment of the firewall circuit 80. Address attributes are received by an Access Type Detection Logic module 81. The Access Type Detection Logic module 81 provides one of four inputs to an AND gate 82. The other inputs to AND gate 82 are the clock signal (CLK), an inverted reset signal (RST), and a supervisory mode bit (SUPERVISOR). The AND gate 82 provides an enable signal to a counter 83, such that when supervisory mode (SUPERVISOR) is detected along with the clock (CLK), an inverted reset (RST), and the output from the Access Type Detection Logic module 81, the counter 83 starts incrementing at zero, and increments at each clock.

The output value of the counter 83 is compared 86 to a value in a firewall value register 85. The comparison result from the comparator 86 is input to a security policy logic module 88. When the value of the counter 83 exceeds the value in the Firewall Value Register 85, the security policy logic module issues a security policy trigger. The security policy trigger may be determined from the Firewall Value Table 60. The firewall value register 85 is loaded from a function based firewall value table 87 based on CPU status 34 received from the CPU 22.

Those skilled in the art will recognize that modifications and variations can be made without departing from the spirit of the invention. Therefore, it is intended that this invention encompass all such variations and modifications as fall within the scope of the appended claims.

We claim:

1. A data processor with a privileged state firewall, comprising:

a central processing unit for executing a plurality of instructions and accessing memory in response to an execution of said plurality of instructions, said central processing unit characterized as operating in a first mode and a second mode which is at a lower privilege level than said first mode;

when in said first mode said central processing unit allows access to a protected system resource by one of said plurality of instructions;

when in said second mode said central processing unit inhibits access to said protected system resource by any of said plurality of instructions; and a firewall circuit coupled to said central processing unit, for recognizing when said central processing unit changes from said second mode to said first mode, and for providing a firewall exception trigger signal if said central processing unit remains in said first mode continuously for a predetermined time.

2. The data processor of claim 1 wherein said central processing unit further provides a status signal which identifies a selected one of a plurality of privilege level chances, and said firewall circuit further activates one of a plurality of policy output signals in response to said status signal.

3. The data processor of claim 1 wherein said central processing unit further provides a status signal which identifies a selected one of a plurality of privilege level changes, and said firewall circuit further activates said firewall exception trigger signal if said central processing unit remains in said first mode continuously for one of a plurality of predetermined times selected in response to said status signal.

4. The data processor of claim 3 wherein said status signal further identifies a selected one of a plurality of privilege level changes, and said firewall circuit further activates one of a plurality of policy output signals in response to said status signal.

5. The data processor of claim 1 wherein said firewall circuit comprises:

a control logic circuit having an input terminal coupled to said central processing unit for receiving a status signal which identifies a selected one of a plurality of privilege level changes, and an output terminal for providing a selection signal in response to said status signal;

a table for storing a plurality of values corresponding to a plurality of privilege level changes, having an input terminal for receiving a selection signal, and an output terminal for providing a value selected by said selection signal at said predetermined time; and timer means coupled to said table for providing said firewall exception trigger signal said predetermined time after said central processing unit changes from said second mode to said first mode and remains in said first mode continuously.

6. The data processor of claim 5 wherein said timer means includes reset means for resetting said timer means in response to said central processing unit returning to said second mode.

7. The data processor of claim 1 wherein said firewall circuit comprises:

a control logic circuit having an input terminal coupled to said central processing unit for receiving a status signal which identifies a selected one of a plurality of privilege level changes, and an output terminal for providing a selection signal in response to said status signal;

a table for storing a plurality of values corresponding to a plurality of privilege level changes, having an input terminal for receiving a selection signal, and an output terminal for providing a value selected by said selection signal;

timer means coupled to said table for providing said firewall exception trigger signal said predetermined time after said central processing unit changes from said second mode to said first mode; and a security policy logic circuit coupled to said table for providing one of a plurality of policy output signals in response to said value selected by said selection signal after receiving said firewall exception trigger signal.

8. The data processor of claim 7 wherein said table comprises a plurality of entries corresponding to one of said plurality of privilege level changes, wherein each entry defines a predetermined time associated with a corresponding privilege level change.

9. The data processor of claim 7 wherein said table comprises an entry corresponding to at least two of said plurality of privilege level changes, wherein said entry defines a predetermined time associated with said at least two of said plurality of privilege level changes.

10. The data processor of claim 1 further comprising:

a memory for storing said plurality of instructions, wherein said memory stores a first portion of said plurality of instructions which are executed in said first mode, and a second portion of said plurality of instructions which are executed in said second mode.

11. The data processor of claim 10 wherein said memory further stores a first plurality of data values associated with said first portion of said plurality of instructions, and a second plurality of data values associated with said second portion of said plurality of instructions.

12. A method for providing a privileged state firewall in a data processor, comprising the steps of:

recognizing when a central processing unit enters a first mode which is at a higher privilege level than a second mode, said central processing unit allowing access to a protected system resource by one of a plurality of instructions in said first mode and inhibiting access to said protected system resource by any of said plurality of instructions when in said second mode;

measuring a passage of time while said central processing unit is continuously in said first mode;

determining when said passage of time exceeds a predetermined time; and activating a firewall exception trigger signal in response to said step of determining.

13. The method of claim 12 further comprising the steps of:
- identifying one of a plurality of privilege level changes which caused said central processing unit to enter said first mode; and
- using a value corresponding to said one of said plurality of privilege level changes as said predetermined time.

14. The method of claim 12 further comprising the steps of:
- identifying one of a plurality of privilege level changes which caused said central processing unit to enter said first mode; and
- using a value corresponding to said one of said plurality of privilege level changes to activate one of a plurality of policy output signals.

15. The method of claim 14 further comprising the step of resetting said central processing unit in response to a selected one of said plurality of policy output signals.

16. The method of claim 14 further comprising the step of destroying an integrated circuit having said central processing unit integrated thereon in response to a selected one of said plurality of policy output signals.

17. The method of claim 14 further comprising the step of disabling a peripheral circuit which is integrated with said central processing unit on a single integrated circuit in response to a selected one of said plurality of policy output signals.

18. In a data processor comprising a central processing unit for executing a plurality of instructions and accessing memory in response to an execution of said plurality of instructions, said central processing unit characterized as operating in a first mode and a second mode which is at a lower privilege level than said first mode, and a timer for counting a predetermined number of periods of a clock signal and providing an output signal in response thereto, the improvement wherein:
- the timer is part of a firewall circuit and the firewall circuit enables a counting of clock signals by said timer when said central processing unit changes from said second mode to said first mode, and resets said timer when said central processing unit changes from said first mode to said second mode.

19. The data processor of claim 18 wherein said central processing unit further provides a status signal which identifies a selected one of a plurality of privilege level changes, and said firewall circuit further activates one of a plurality of policy output signals in response to said status signal.

20. The data processor of claim 18 wherein said central processing unit further provides a status signal which identifies a selected one of a plurality of privilege level changes, and said firewall circuit further activates a firewall exception trigger signal if said central processing unit remains in said first mode continuously for one of a plurality of predetermined times selected in response to said status signal.

21. The data processor of claim 20 wherein said status signal further identifies a selected one of a plurality of privilege level changes, and said firewall circuit further activates one of a plurality of policy output signals in response to said status signal.

\* \* \* \* \*